US006968373B1

(12) United States Patent
Norris et al.

(10) Patent No.: US 6,968,373 B1
(45) Date of Patent: Nov. 22, 2005

(54) SYSTEM, COMPUTER PROGRAM, AND METHOD FOR NETWORK RESOURCE INVENTORY

(75) Inventors: James Norris, Kansas City, MO (US); John Everson, Kansas City, MO (US); Daniel G. LaMastres, Independence, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 742 days.

(21) Appl. No.: 10/036,014

(22) Filed: Dec. 28, 2001

(51) Int. Cl.[7] ............................................. G06F 15/173
(52) U.S. Cl. ....................... 709/223; 709/224; 709/225
(58) Field of Search ................................ 709/212, 223, 709/224, 225, 226, 227

(56) References Cited

U.S. PATENT DOCUMENTS 6,338,050 B1 * 1/2002 Conklin et al. ............... 705/80

2001/0052013 A1 * 12/2001 Munguia et al. ............. 709/225

* cited by examiner

Primary Examiner—Gertrude A. Jeanglaude

(57) ABSTRACT

A system (10), computer program, and method for automatically and periodically conducting an inventory of one or more network assets (12) or resources, such as, for example, servers, workstations, or firewalls, using an agent (16) running on each asset (12) to perform the inventory and collect inventory data which may thereafter be sent in a secure manner to a designated location where it can be parsed and from which pertinent information can be saved. Thereafter, the stored information may be used, for example, to generate inventory reports for determining network vulnerabilities, checking software licenses, and tracking network assets. In a preferred embodiment, the system (10) broadly comprises one or more separate instances of an inventory agent (16); one or more collection servers (18); a directory server (20); and a reporting server (22). The present invention also makes use of digital certificates for identification, authentication, and, optionally, encryption purposes.

23 Claims, 3 Drawing Sheets

SYSTEM, COMPUTER PROGRAM, AND METHOD FOR NETWORK RESOURCE INVENTORY

BACKGROUND OF THE INVENTION

1. Field of the Invention

The present invention relates to a system, computer program, or method for performing inventories of network assets or resources. More particularly, the present invention relates to a system, computer program, or method for automatically and periodically performing inventories of one or more network assets or resources, such as, for example, servers, workstations, or firewalls, using a small non-intrusive agent running on each asset to gather and send information in a secure manner to a designated collection server where it can be parsed and wherefrom pertinent information can be saved to a directory server, whereafter the information may be retrieved by a reporting server and used to generate specific reports for use in, for example, determining network vulnerabilities, checking software licenses, and tracking network assets.

2. Description of the Prior Art

In a computer network comprising a plurality of assets or resources, including, for example, servers, workstations, or firewalls, it is often desirable to have available a complete and current inventory of each asset. Such an inventory provides data for use in a variety of desirable functions, including, for example, tracking vulnerabilities (e.g., determine whether operating system versions are up-to-date, or that any appropriate or required patches have been applied); checking software licenses; and tracking the existence and location of assets, whether physical or logical in nature.

Inventory mechanisms exist for conducting inventories of network assets or resources, but these mechanisms typically use undesirably large and disruptive processes to gather the information and put it into a useful format. Furthermore, parsing and analysis of the inventory data is typically performed on and by the asset being inventoried, thereby substantially reducing the availability of processing and memory resources more preferably dedicated toward the asset's primary function.

Additionally, when a change is desired in the protocol for performing the inventory, existing inventory mechanisms typically require that such changes be made separately on every asset to which the changes apply. It will be appreciated that where the number of such assets is in the hundreds or thousands, such changes are extremely inefficient, tedious, and time-consuming.

Additionally, existing inventory mechanisms typically provide no means of identification or authentication of inventory data, nor do they provide security when transferring such data. For example, those with skill in the computer-related arts are familiar with "spoofing", which means to deceive, possibly by simulating a communications protocol, in order to gain access to an asset or resource. A well-known spoofing technique involves presenting a fake IP address to disguise the actual source of a communication. Because they provide no means of identification or authentication, existing inventory mechanisms are vulnerable to such spoofing.

Due to the above-identified and other problems and disadvantages in the art, a need exists for an improved inventory mechanisms for performing inventories of network assets or resources.

SUMMARY OF THE INVENTION

The present invention provides a distinct advance in the art of systems, computer programs, and methods for performing inventories of network assets or resources. More particularly, the present invention provides a system, computer program, and method for automatically and periodically conducting inventories of one or more network assets or resources, such as, for example, servers, workstations, and firewalls, using an agent running on each asset to perform the inventory and collect inventory data which may thereafter be sent in a secure manner to a designated location where it can be parsed and from which pertinent information can be saved. Thereafter, the stored information may be retrieved by a reporting server and used, for example, to generate inventory reports for determining network vulnerabilities, checking software licenses, and tracking network assets.

In a preferred embodiment, the system broadly comprises one or more instances of an inventory agent; one or more collection servers; a directory server; and a reporting server. A separate and distinct instance of the inventory agent runs on each asset. The inventory agent is a small, non-intrusive program that, in accordance with a set of pre-established operating parameters, performs the inventory and collects the resulting inventory data automatically and at periodic intervals. The operating parameters may be stored and accessed locally or stored on and requested from the directory server. The inventory agent generates a report of the collected inventory data, utilizes a digital certificate to identify the asset, to provide authentication, and to encrypt the inventory report which is sent to a designated one of the collection servers.

The one or more collection servers are each dedicated to receiving the inventory reports generated by some or all of the separate instances of the inventory agent, parsing or analyzing the information contained therein, and saving any relevant data to the directory server. The collection server uses a digital certificate to decrypt the inventory report and to identify the asset to which the inventory report corresponds.

The directory server stores the inventory data, and, as mentioned, may store and distribute operating parameters for the inventory agent. The inventory data is stored as objects in a hierarchical database, wherein the objects are grouped in some logical manner, such as, for example, by type of asset (e.g., server, workstation, firewall), for ease of reporting and browsing.

The reporting server is operable to query the directory server for some or all of the inventory data, as desired. The reporting server includes one or more computer programs for generating specific reports based upon the inventory data.

The present invention provides a number of advantages over existing inventory mechanisms, including parsing or analyzing the inventory data on the collection server rather than the asset, thereby advantageously minimizing the inventory's adverse impact on the asset's processing and storage resources. Furthermore, by storing the operating parameters on the directory server, rather than locally, and having each separate instance of the inventory agent query the directory server for changes to the operating parameters, efficiency is greatly increased by allowing an administrator to make only one change at the directory server rather than a separate change in each of possibly hundreds or thousands of local configuration files. Additionally, use of the digital certificate allows each inventory report to be "signed", thereby preventing spoofing and poor data input. Additionally, use of the digital certificate allows for encryption of the inventory report sent between the inventory agent and the collection server.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
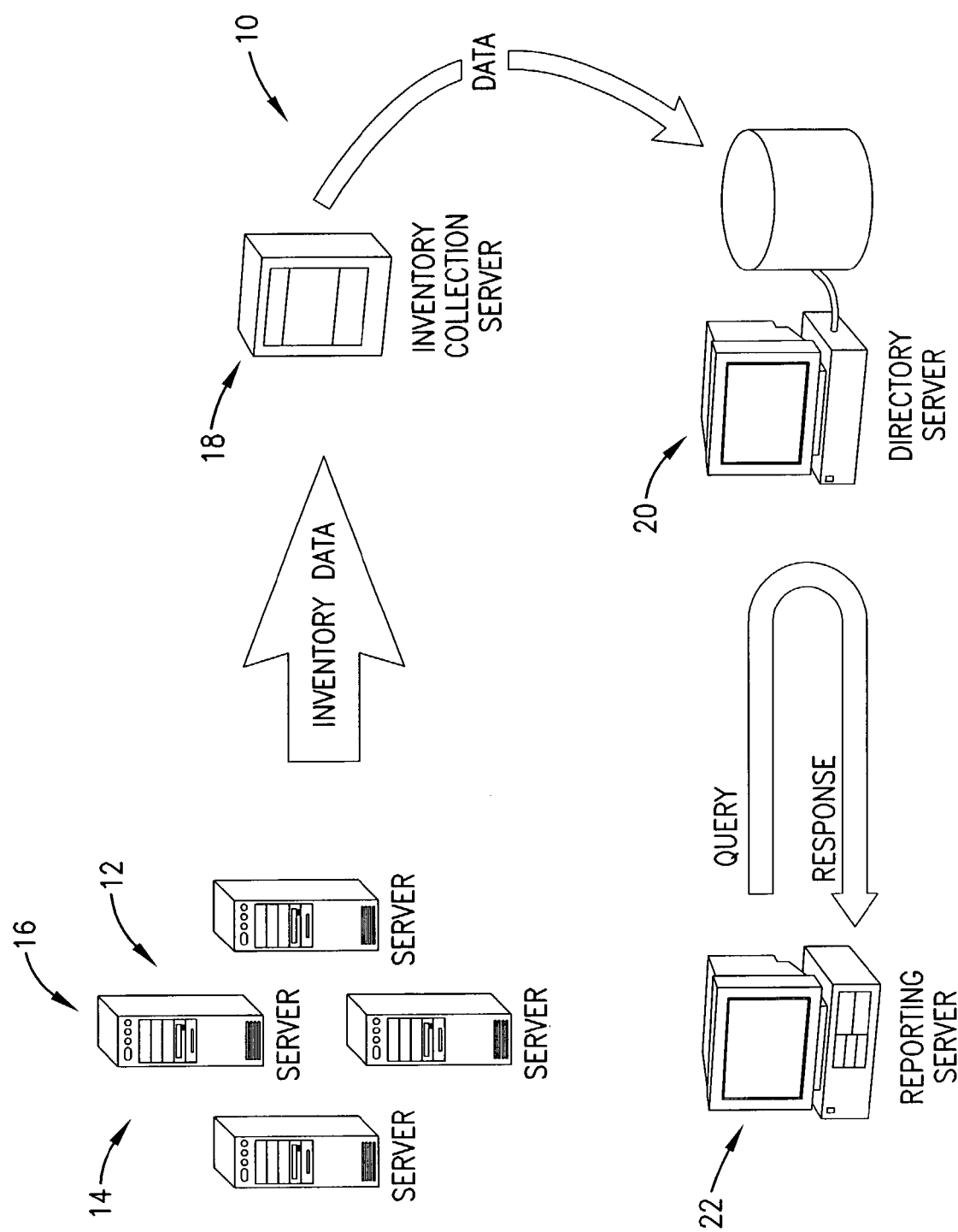
FIG. 1 is a depiction of a system used in a preferred embodiment of the present invention.

Referring to FIG. 1, a system 10 is shown constructed in accordance with a preferred embodiment of the present invention. The system 10 is operable to automatically and periodically conduct inventories of one or more assets 12 of a network 14, wherein the assets 12 may include, for example, UNIX or NT servers, mainframes, workstations, and firewalls. The preferred system 10 broadly comprises one or more instances of an inventory agent 16; one or more collection servers 18; a directory server 20; and a reporting server 22.

Those with skill in the computer-related arts will appreciate that an agent is a program that, in accordance with pre-established operating parameters, gathers information or performs some other service automatically and, typically, at periodic intervals. In the present invention, each asset 12 hosts its own separate instance of the small non-intrusive inventory agent 16 which is operable to conduct an inventory of the asset 12 to collect inventory data, such as, for example, the asset's current IP address, the asset's current operating system and version, and any daemons, processes, or services and their versions currently running on the asset 12, and to generate an inventory report containing the collected inventory data. The inventory report is then sent to a designated one of the collection servers 18. No parsing or analysis of the inventory data is performed by the asset 12, thereby advantageously minimizing the inventory's adverse impact on the asset's processing and storage resources.

The operating parameters or configuration details for guiding the inventory process and the actions of the inventory agent 16, including, for example, the periodicity with which to generate the inventory report and an IP address of a particular one of the one or more collection servers 18 to which to send the inventory report, can be stored either in a local configuration file or on the directory server 20, as desired. If the operating parameters are stored on the directory server 20, then each separate instance of the inventory agent 16 will automatically and periodically query the directory server 20 for updates or changes to the operating parameters. Storing the operating parameters on the directory server 20, rather than locally, and having each separate instance of the inventory agent 16 query the directory server 20 for changes to the operating parameters, greatly increases efficiency by allowing an administrator to make only one change at the directory server 20 rather than requiring a separate change in each of possibly hundreds or thousands of local configuration files.

Each separate instance of the inventory agent 16 preferably includes a digital certificate operable to uniquely identify the asset. It will be appreciated by those with skill in the computer-related arts, that a digital certificate is an electronic identification mechanism issued by a certification authority (CA) and operable to reliably establish identity and authorization when conducting transactions over a network. Typically, the digital certificate will include a digital signature of the certificate-issuing authority so that a recipient can verify that the certificate is real. The digital certificate may also include a copy of the certificate holder's public key, which may be used for encrypting communications. Thus, in the present invention, the digital certificate allows each inventory report to be "signed", thereby preventing spoofing and poor data input by allowing each separate instance of the inventory agent 16 to sign its inventory reports in order to uniquely identify the asset 12 to which it belongs, regardless of the asset's host name, DNS name, or IP address. Furthermore, as desired, the digital certificate can be used to encrypt the inventory report prior to sending it to the designated collection server 18.

The one or more collection servers 18 are each dedicated to receiving the inventory reports generated by some or all of the separate instances of the inventory agent 16, parsing the information contained therein, and saving any relevant data to the directory server 20. There can be any number of collection servers 18. The present invention is independent of any particular parsing or analysis scheme, with such scheme being instead based largely upon application-specific needs and desires for particular data. As mentioned, the collection server 18 uses the digital signature accompanying the inventory report to identify the asset 12 to which the inventory report corresponds. The collection server 18 may also use the digital certificate to decrypt any encrypted inventory reports.

Figure 2:
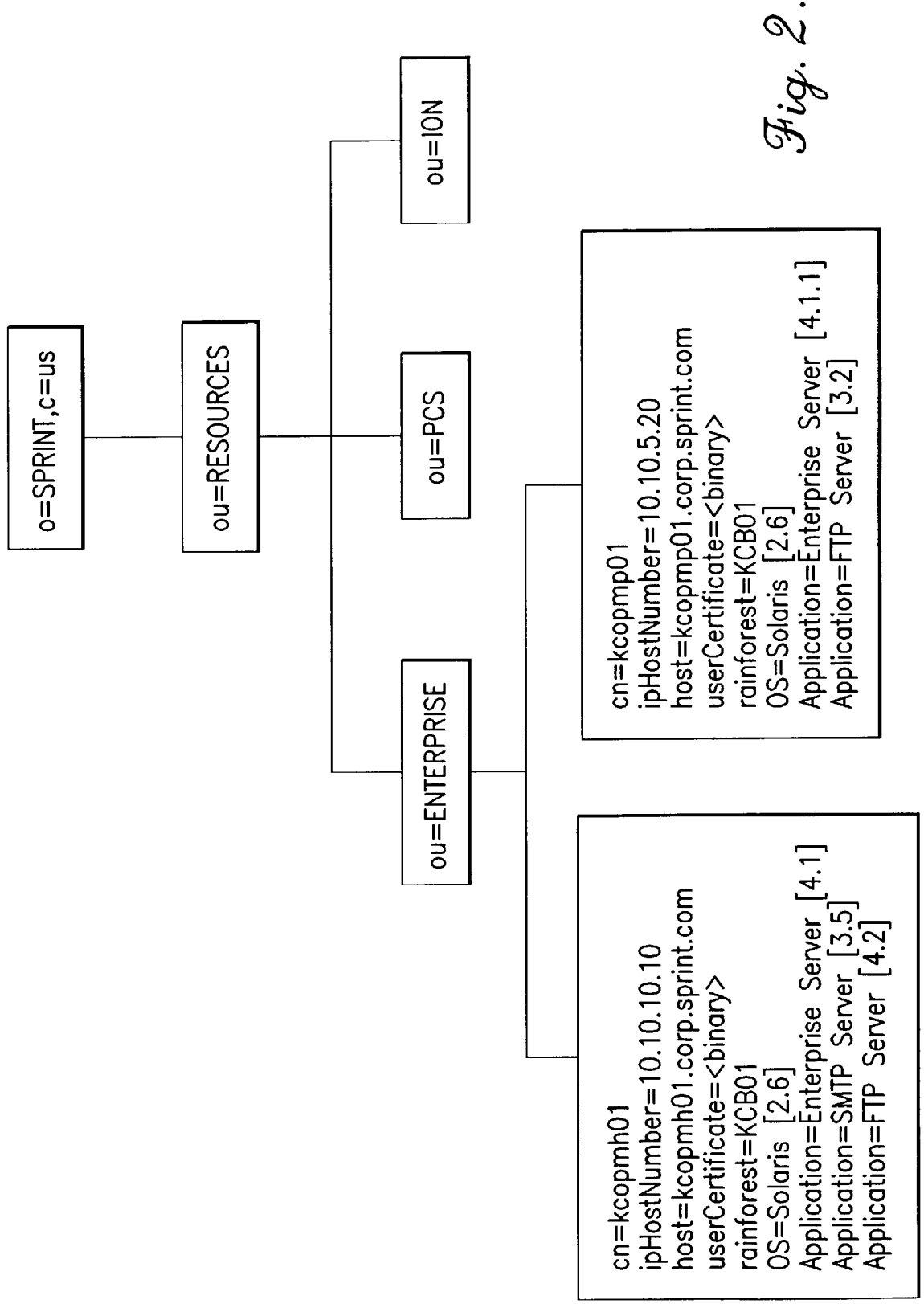
FIG. 2 is a tree diagram of a hierarchical storage scheme in a directory server component of the embodiment shown in FIG. 1.

Referring also to FIG. 2, the directory server 20 stores the inventory data, and, as mentioned, may also store and distribute operating parameters for the inventory agent 16. As illustrated, the directory server 20 includes an X.500 directory with an LDAP front-end. The parsed inventory data is stored as objects 30 in a hierarchical database 32 wherein the objects 30 are grouped in some logical manner, such as, for example, by type of asset 12 (e.g., server, workstation, firewall), for ease of reporting and browsing.

The reporting server 22 is operable to query the directory server 20 for some or all of the inventory data, as desired. The reporting server 22 includes one or more computer programs for generating specific reports based upon the inventory data. Such specific reports may relate to or facilitate, for example, tracking vulnerabilities (e.g., determining whether operating system versions are up-to-date, or that any appropriate or required patches have been applied); checking software licenses; and tracking the existence and location of assets 12.

The system 10 operates in conjunction with a computer program component of the present invention to facilitate implementation of the steps shown in FIG. 3 and described below. Based upon the description of the present invention provided herein, creation of the computer program is considered to be within the skill of a programmer having ordinary skill in the art.

The computer program preferably comprises a combination of code segments that may be written in any suitable programming language, such as, for example, Java or C++, and stored in or on any suitable computer-readable memory medium, such as, for example, a hard drive or compact disk, and executed by the system 10. As mentioned, each asset 12 is provided only with its own instance of the small non-intrusive inventory agent 16, and, in some embodiments, the configuration file of operating parameters. By far, the largest portion of the computer program resides on the collection and reporting servers 18,22, thereby advantageously minimizing any adverse impact on the assets' processing, storage, and other computing resources.

Figure 3:
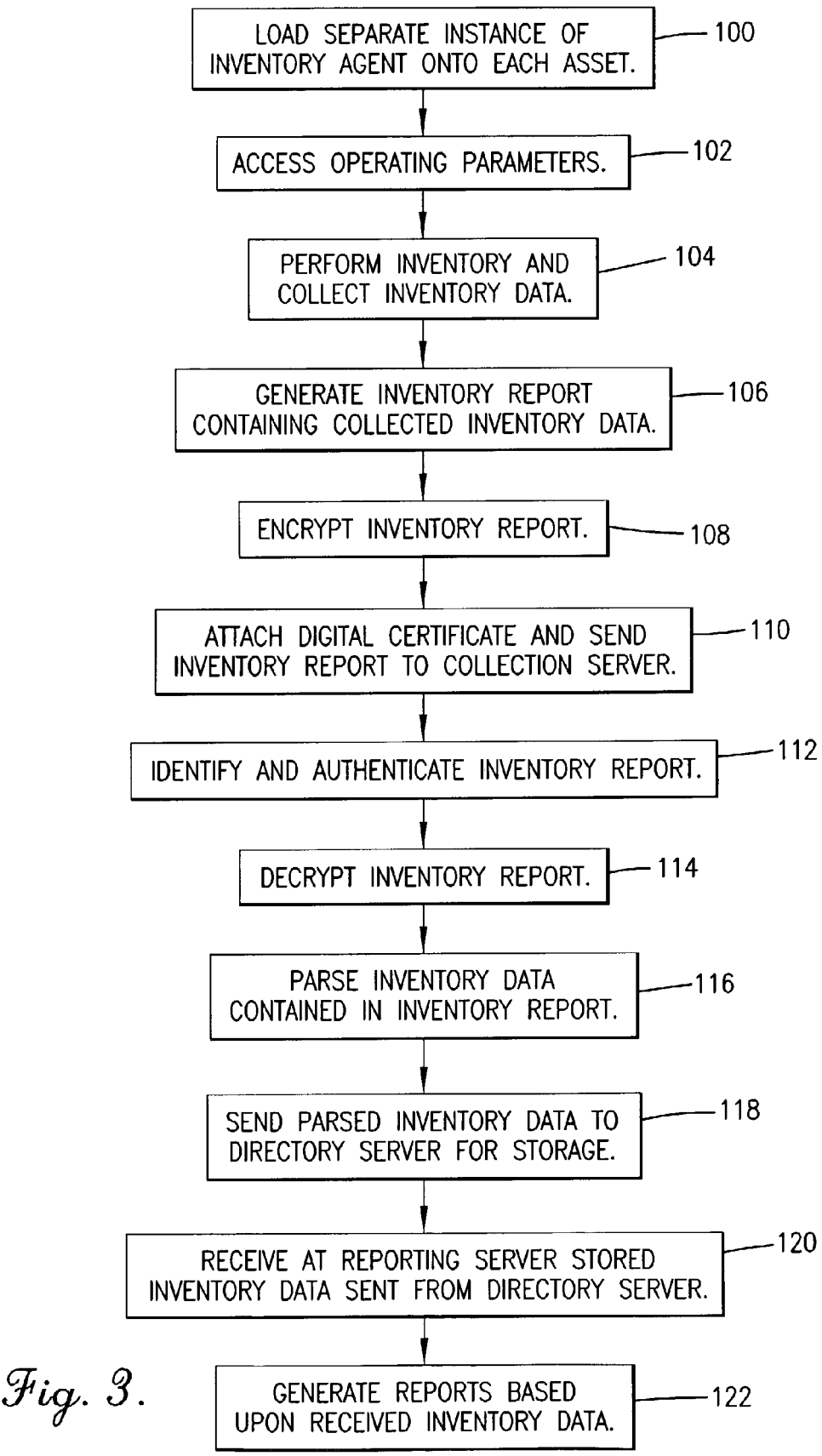
FIG. 3 is a flowchart of a process of operation of the embodiment shown in FIG. 1.

In exemplary use and operation, referring to FIG. 3, a separate instance of the inventory agent 16 is loaded onto and stored on each of the assets 12 for which an inventory may be desired, as depicted by box 100. Each separate instance of the inventory agent 16 will access the operating parameters, either from a configuration file stored on the asset 16 or by querying the directory server 20, as depicted by box 102. The operating parameters will include information regarding the periodicity with which to perform the inventory and the IP address or host name of the particular collection server 18 to which to send the completed inventory report. The operating parameters need not be the same for each asset 12, rather the assets 12 may be grouped according to some pre-established logical and practical scheme, such as, for example, by type or value or use, and appropriate operating parameters established for each asset group.

In accordance with the operating parameters, the inventory agent 16 performs an inventory on the asset 12, as depicted by box 104, collecting inventory data, such as, for example, the asset's current IP address, the asset's current operating system and version, and any daemons, processes, or services and their versions currently running on the asset 12. The inventory agent 16 generates an inventory report containing the collected inventory data, as depicted in box 106, encrypts and signs the report, as depicted in box 108, and sends the inventory report to the designated the collection server 18, as depicted in box 110.

Upon receipt, the collection server 18 identifies, authenticates, and decrypts the inventory report using its digital certificate, as depicted by boxes 112 and 114. The collection server 18 then parses or analyzes the inventory data contained in the inventory report, as depicted by box 116. The parsed data is then sent to the directory server 20 for storage, as depicted by box 118.

Thereafter, as required or at regular intervals, the reporting server 22 retrieves the stored inventory data from the directory server 20, as depicted by box 120. The reporting server 22 will run one or more programs to generate specific reports based upon the received inventory data, as depicted by box 122. As mentioned, such specific reports may relate to or facilitate, for example, tracking vulnerabilities (e.g., determining whether operating system versions are up-to-date, or that any appropriate or required patches have been applied); checking software licenses; and tracking the existence and location of assets 12.

The above-described inventory process is repeated automatically and periodically, such that no human intervention is required, other than, possibly, occasional changes to the operating parameters when desired.

From the preceding description, it can be appreciated that the system 10, computer program, and method of the present invention provide for automatically and periodically conducting an inventory of the assets 12 of the network 14 using the separate instance of the small non-intrusive inventory agent 16 running on each asset 12 to gather and send information in a secure manner to the centralized collection server 18 where it can be parsed and where pertinent information can be saved to the directory server 20, whereafter the information may be sent to the reporting server 22 and used, for example, to generate inventory reports for determining network vulnerabilities, checking software licenses, and tracking network assets.

Although the invention has been described with reference to the preferred embodiments illustrated in the attached drawings, it is noted that equivalents may be employed and substitutions made herein without departing from the scope of the invention as recited in the claims. For example, as mentioned, any practical number of assets 12 may be inventoried provided each has its own separate instance of the inventory agent 16 and a sufficient number of collection, directory, and reporting servers 18,20,22 are used.

Having thus described the preferred embodiment of the invention, what is claimed as new and desired to be protected by Letters Patent includes the following:

1. A system for performing an inventory of a plurality of assets of a network, the system comprising:
   an instance of an agent running on each of the assets and operable, in accordance with a set of operating parameters, to perform the inventory and to generate a respective set of inventory data based thereupon;
   a collection server operable to receive the inventory data from the agents, and to parse the sets of inventory data according to a pre-established parsing scheme; and
   a directory server operable to receive the parsed sets of inventory data from the collection server, and to store the parsed sets of inventory data for future reference.

2. The system as set forth in claim 1, wherein each of the assets is selected from the group consisting of: servers, workstations, and firewalls.

3. The system as set forth in claim 1, wherein the set of operating parameters include—
   a periodicity with which to perform the inventory; and
   an IP address of the collection server.

4. The system as set forth in claim 1, wherein the set of inventory data includes—
   a type and a version of an operating system running on the asset;
   a current IP address of the asset; and
   a type, a version, and a name of a software application running on the asset.

5. The system as set forth in claim 1, wherein each of the agents includes a digital certificate operable to identify the respective asset to the collection server and to authenticate the respective set of inventory data.

6. The system as set forth in claim 5, wherein the digital certificate allows for encryption of the respective set of inventory data.

7. The system as set forth in claim 1, wherein the directory server stores the parsed set of inventory data in a hierarchical database.

8. A system for performing an inventory of a plurality of assets of a network, the system comprising:
   an instance of an agent stored on and executed by each of the assets and operable, in accordance with a set of operating parameters, to perform the inventory and to generate a respective set of inventory data based thereupon, with the agent having a digital certificate operable to identify the asset and to authenticate the set of inventory data;
   a collection server operable to receive the sets of inventory data from the agents, identify the assets, authenticate the sets of inventory data, and parse the sets of inventory data according to a pre-established parsing scheme; and a directory server operable to receive the parsed sets of inventory data from the collection server, and to store the parsed sets of inventory data for future reference.

9. The system as set forth in claim 8, wherein each of the assets is selected from the group consisting of: servers, workstations, and firewalls.

10. The system as set forth in claim 8, where the set of operating parameters include—
   a periodicity with which to perform the inventory; and
   an IP address of the collection server.

11. The system as set forth in claim 8, wherein the set of inventory data includes—
   a type and a version of an operating system running on the asset;
   a current IP address of the asset; and
   a type, a version, and a name of a software application running on the asset.

12. The system as set forth in claim 8, wherein the digital certificate allows for encryption of the set of inventory data.

13. The system as set forth in claim 8, wherein the directory server stores the parsed sets of inventory data in a hierarchical database.

14. A system for performing an inventory of a plurality of assets of a network, the system comprising:
   an instance of an agent stored on and executed by each of the assets and operable to perform the inventory and to generate a respective set of inventory data based thereupon, wherein the inventory is performed in accordance with a set of operating parameters including a periodicity with which to perform the inventory and an identifier which identifies the collection server;
   a collection server operable to receive the sets of inventory data from the agents, and to parse the sets of inventory data according to a pre-established parsing scheme; and
   a directory server operable to receive the parsed sets of inventory data from the collection server, and to store the parsed sets of inventory data in a hierarchical database for future reference.

15. A computer program for performing an inventory on a plurality of assets of a network, wherein the computer program is storable on a computer-readable memory medium and executable by a computing device, the computer program comprising:
   a code segment for storing in a plurality of instances on said assets and for performing, according to a set of operating parameters, the inventory of the asset to generate a respective set of inventory data;
   a code segment for sending the respective sets of inventory data to a collection server;
   a code segment for parsing the sets of inventory data at the collection server; and
   a code segment for storing the parsed sets of inventory data.

16. The computer program as set forth in claim 15, wherein the code segment for storing the parsed sets of inventory data does so in a hierarchical format.

17. A method of performing an inventory on a plurality of assets of a network, the method comprising the steps of:
   (a) performing, according to a set of operating parameters, the inventory of each of the assets to generate a respective set of inventory data;
   (b) sending the sets of inventory data to a collection server;
   (c) parsing the sets of inventory data at the collection server; and
   (d) storing the parsed sets of inventory data.

18. The method as set forth in claim 17, wherein step (d) involves storing the parsed sets of inventory data in a hierarchical format.

19. The method as set forth in claim 17, further including the step of (e) providing a digital signature to accompany the respective set of inventory data.

20. The method as set forth in claim 17, further including the step of (e) encrypting the respective sets of inventory data prior to step (b) and decrypting the respective sets of inventory data prior to step (c).

21. A method of performing an inventory on a plurality of assets of a network, the method comprising the steps of:
   (a) performing, according to a set of operating parameters, the inventory of each of the assets to generate a respective set of inventory data;
   (b) providing a respective digital signature to accompany the sets of inventory data;
   (c) encrypting the sets of inventory data;
   (d) sending the sets of inventory data to a collection server;
   (e) identifying the assets and authenticating the sets of inventory data at the collection server based upon the digital certificates;
   (f) decrypting the sets of inventory data at the collection server;
   (g) parsing the sets of inventory data at the collection server; and
   (h) storing the parsed sets of inventory data in a hierarchical format.

22. A system for performing an inventory of an asset of a network, the system comprising:
   an agent operable, in accordance with a set of operating parameters, to perform the inventory and to generate a set of inventory data based thereupon;
   a collection server operable to receive the inventory data from the agent, and to parse the set of inventory data according to a pre-established parsing scheme; and
   a directory server operable to receive the parsed set of inventory data from the collection server, and to store the parsed set of inventory data for future reference;
   wherein the set of inventory data includes—
      a type and a version of an operating system running on the asset;
      a current IP address of the asset; and
      a type, a version, and a name of a software application running on the asset.

23. A system for performing an inventory of an asset of a network, the system comprising:
   an agent stored on and executed by the asset and operable, in accordance with a set of operating parameters, to perform the inventory and to generate a set of inventory data based thereupon, with the agent having a digital certificate operable to identify the asset and to authenticate the set of inventory data;
   a collection server operable to receive the set of inventory data from the agent, identify the asset, authenticate the set of inventory data, and parse the set of inventory data according to a pre-established parsing scheme; and
   a directory server operable to receive the parsed set of inventory data from the collection server, and to store the parsed set of inventory data for future reference;
   wherein the set of inventory data includes—
      a type and a version of an operating system running on the asset;
      a current IP address of the asset; and
      a type, a version, and a name of a software application running on the asset.

* * * * *